United States Patent [19]

Morikawa

[11] Patent Number: 4,887,122
[45] Date of Patent: Dec. 12, 1989

[54] COPYING MACHINE

[75] Inventor: Takeshi Morikawa, Osaka, Japan

[73] Assignee: Minolta Camera Kabushiki Kaisha, Osaka, Japan

[21] Appl. No.: 267,446

[22] Filed: Nov. 4, 1988

[30] Foreign Application Priority Data

Nov. 4, 1987 [JP] Japan .................................. 62-278811
Nov. 5, 1987 [JP] Japan .................................. 62-280195

[51] Int. Cl.⁴ .............................................. G03B 27/52
[52] U.S. Cl. ......................................... 355/30; 355/69
[58] Field of Search ...................... 355/69, 30; 313/13, 313/15; 315/309; 362/6

[56] References Cited

U.S. PATENT DOCUMENTS 4,463,284  7/1984  Tamura .............................. 355/69 X
4,760,609  7/1988  Tamagaki ........................... 355/69 X

FOREIGN PATENT DOCUMENTS 57-8471   2/1982  Japan .
60-55766  4/1985  Japan .
61-102659 5/1986  Japan .
61-275735 12/1986 Japan .

Primary Examiner—L. T. Hix
Assistant Examiner—D. Rutledge
Attorney, Agent, or Firm—Price, Gess & Ubell

[57] ABSTRACT

A copying machine having a fluorescent lamp as a light source for illuminating an original document. The copying machine comprises a lamp control system connected to an optical sensor for detecting light intensity of the lamp. The lamp control system is operable for maintaining the tube wall temperature of the lamp constant during a standby period prior to a copying operation. This lamp control system continues power supply or supplies power at a high level to the lamp while the light intensity detected by the sensor is on the increase, and interrupts the power supply for a predetermined period or supplies power at a low level to the lamp following a decrease in the light intensity.

7 Claims, 9 Drawing Sheets

COPYING MACHINE

BACKGROUND OF THE INVENTION

The present invention relates to a copying machine comprising a document illuminating apparatus including as its document exposure light source a fluorescent lamp which consumes less electric power and becomes less heated than a halogen lamp.

More particularly, the document illuminating apparatus includes, along with the fluorescent lamp, a lamp control device for the controlling power supply to the fluorescent lamp during a standby period such that the tube wall of the lamp is maintained at an optimal temperature for realizing a maximum emission efficiency. Since this apparatus employs a fluorescent lamp which requires a long warm-up time, it is desirable to maintain the tube wall at the optimal temperature during the standby period by utilizing the self-heating of the lamp in a controlled manner without seeking the aid of a heater or other separate heating means. Then a subsequent waiting time is shortened for starting a copying operation with an original document illuminated properly.

A known example of such a document illuminating apparatus is disclosed in Japanese Patent Publication No. 57-8471. This apparatus includes a temperature sensor for detecting the tube wall temperature of the fluorescent lamp. Power supply to the fluorescent lamp is controlled in response to detection results provided by the temperature sensor such that the lamp is turned off when the tube wall temperature exceeds the optimal temperature of about 40° C. and is turned on when the tube wall temperature falls below the optimal temperature.

However, this document illuminating apparatus has the following disadvantage,

As noted above, the temperature sensor is used to detect the tube wall temperature of the fluorescent lamp for controlling the power supply to the lamp in order to maintain the tube wall temperature in the vicinity of 40° C. This temperature detection is effected in a direct way and may therefore be reliable. In practice, however, it is difficult to detect the temperature of a tube wall portion having a direct influence on the document illumination while situating the temperature sensor out of interference with the document illumination. Thus the temperature must be detected at a wall position adjacent a tube end and, besides, the detection is vulnerable to the influence of ambient temperature. Consequently, the temperature sensor tends to provide inaccurate detection results. The control of power supply to the fluorescent lamp based on such detection results may cause the tube wall temperature of the fluorescent lamp to deviate to a serious degree from the optimal temperature.

SUMMARY OF THE INVENTION

A primary object of the present invention is to provide a copying machine having a document illuminating apparatus which eliminates the disadvantage of the prior art and maintains the tube wall of the fluorescent lamp at the optimal temperature with increased reliability.

The above object is accomplished, according to the present invention, by a copying machine having a fluorescent lamp as its document exposure light source, comprising means for commanding a copy start; exposure scanning means for scanning an original document being exposed by illumination of the lamp in response to a command from the copy start command means; means for detecting the light intensity of the lamp; and power supply means operable outside a document exposure scanning time and in response to an output of the detecting means for supplying power to the lamp to emit light while maintaining a tube wall temperature of the lamp constant.

In the above construction, the power supply to the fluorescent lamp is controlled in response to the light intensity of the lamp, whereby the tube wall of the lamp is maintained at the optimal temperature.

In a preferred embodiment of the present invention, the power supply means is operable for continuing the power supply to the lamp while the light intensity detected by the detecting means is increasing, and for interrupting the power supply for a predetermined period following a decrease in the light intensity, thereby to maintain the tube wall temperature of the lamp constant.

According to this construction, while the detected light intensity of the fluorescent lamp is on the increase, the tube wall temperature is judged to be still rising and not to have reached the optimal temperature. Then the power supply to the fluorescent lamp is continued to raise the tube wall temperature through self-heating of the lamp. When the detected light intensity begins to decrease, the tube wall temperature is judged to have exceeded the optimal temperature. Then the power supply is interrupted for the predetermined period to stop the self-heating of the lamp until the tube wall temperature becomes lower than the optimal temperature. These steps are repeated in response to the light intensity detected by the detecting means during a standby period prior to document illumination. As a result, the tube wall temperature is maintained in the vicinity of the optimal temperature. The original document can therefore be illuminated properly by the fluorescent lamp in the state of maximum emission efficiency immediately upon initiation of a copying operation.

Where the invention is applied to a copying machine which essentially shuts out other light than the light of the fluorescent lamp, the tube wall temperature of the lamp is detected accurately at all times without any detrimental effect of external light and regardless of variations in the ambient temperature. Compared with the known construction for controlling the tube wall temperature in response to wall temperature detections by the temperature sensor, the present invention provides the advantage of maintaining the tube wall at the optimal temperature with increased reliability.

According to a further embodiment of the present invention, the power supply means is operable for supplying power to the lamp selectively at a first level for increasing the tube wall temperature of the lamp and at a second level for decreasing the tube wall temperature. This power supply means is also operable, with a decrease in the tube wall temperature detected by the detecting means, for cyclically alternating the power supply to the lamp at the first level and at the second level, thereby to maintain the tube wall temperature constant. This construction is also effective for maintaining the tube wall at the optimal temperature.

Further, a difference between the first level and the second level may be caused to diminish with each cycle of alternation. It is then possible to control the power supply so as to substantially equalize an amount of heat dissipation to the ambient and an amount of self-heating of the fluorescent lamp. As a result, the tube wall temperature may be maintained very close to the optimal temperature.

The copying machine often includes an optical sensor for detecting document density in order to maintain copy density substantially constant regardless of variations in the document density. Where the present invention is applied to such a machine, the optical sensor may be utilized also as means for detecting the light intensity. This arrangement provides a further advantage in realizing a simple construction and low cost.

The above and other objects, features and advantages of the invention will become apparent from the following more particular description of preferred embodiments of the invention, as illustrated in the accompanying drawings.

DESCRIPTION OF THE PREFERRED EMBODIMENTS

Figure 1:
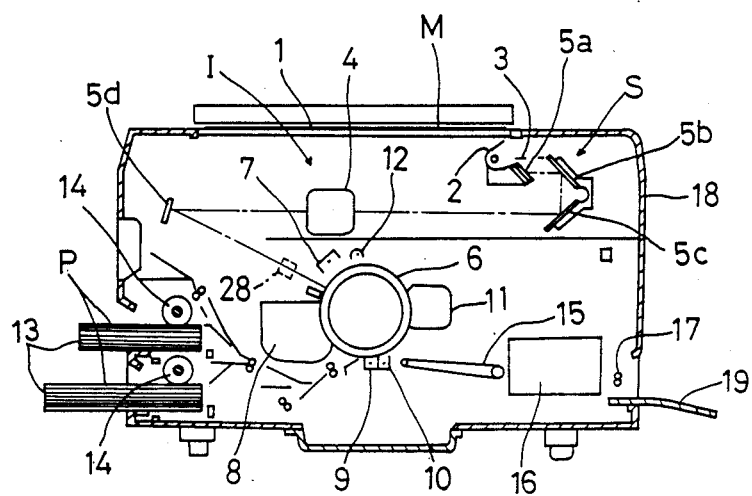
FIG. 1 is a schematic sectional view of an electrophotographic copying machine according to the present invention.

FIG. 1 is a schematic section showing a slit scanning type electrophotographic copying machine having a document illuminating apparatus according to the present invention.

This copying machine comprises a document table 1 formed of a glass plate, for example, and a fluorescent lamp 2 for illuminating an original document M placed on the document table 1. Light reflected from the document M passes through a slit 3 to be projected onto a photoreceptor drum 6 by an image-forming optical system I including an image-forming lens 4 and a plurality of mirrors 5a–5d.

The fluorescent lamp 2, slit 3 and first mirror 5a constitute a scanning device S which is driven by a DC motor (not shown) to move and scan the document M leftward in FIG. 1 at a predetermined speed (v). The second mirror 5b and third mirror 5c are also driven by the same DC motor to move leftward at half the speed (v/2) of the scanning device S in order to maintain an image forming optical path formed by the optical system I at a constant length.

The light reflected from the document M scanned by the scanning device S forms an electrostatic latent image of the document M on the photoreceptor drum 6 driven by another motor (not shown) to rotate at a constant speed counterclockwise in FIG. 1.

The drum 6 is surrounded by a charger 7 for uniformly charging the drum surface, a developing device 8 for developing the electrostatic latent image by applying toner, a transfer device 9 for transferring the toner image to recording paper P, a separating device 10 for separating the recording paper P carrying the toner image from the drum 6, a cleaning device 11 for removing excess toner adhering to the drum surface after the image transfer, and a main eraser lamp 12 for erasing the electric charge from the drum surface.

The recording paper P is stored in sheet feed cassettes 13, and is picked up one sheet after another by pickup rollers 14 in response to a recording signal, to be fed to the transfer device 9.

The recording paper P, having received the toner image from the drum 6 at the transfer device 9 and separated from the drum 6 by the separating device 10, is transported by a conveyor belt 15 to a fixing device 16. The fixing device 16 fixes the toner image to the recording paper P by heating and fusing the toner. Thereafter the recording paper P is discharged by a discharge roller pair 17 from a machine body 18 onto a tray 19 provided outside.

Figure 2:
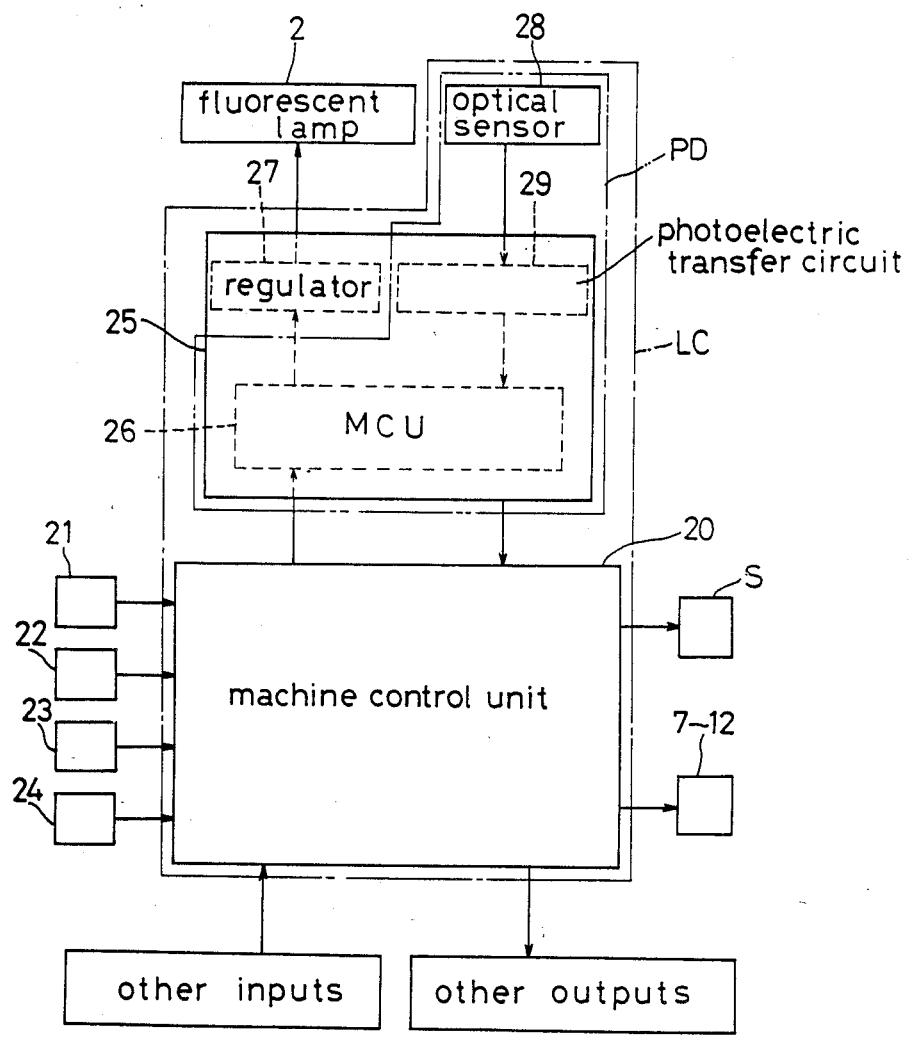
FIG. 2 is a block diagram of a control system of the copying machine.

FIG. 2 schematically shows a control system, together with peripheral devices, for controlling operation of the electrophotographic copying machine. This control system includes a machine control unit 20 as a main component thereof. Various keys and switches are connected to the machine control unit 20, such as a main switch 21, a print key 22, a copy density setting key 23 and a copying condition setting key 24. In response to signals input from these keys and switches, the machine control unit 20 controls the scanning device S and the various devices 7–12 arranged around the photoreceptor drum 6.

Figure 3:
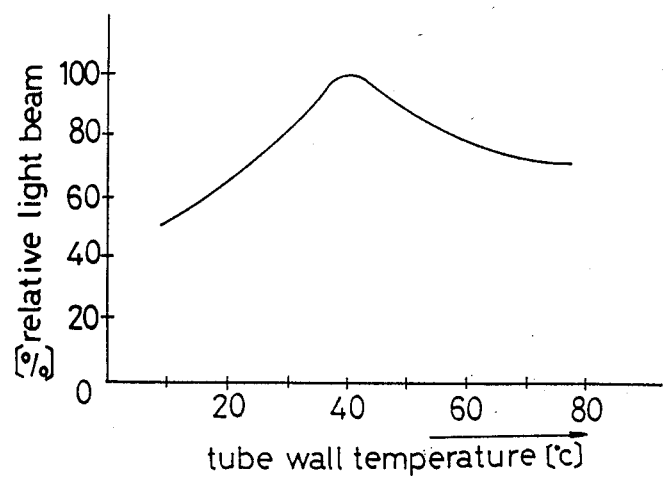
FIG. 3 is a graph showing a relationship between tube wall temperature and relative light beam of a fluorescent lamp.

The control system further indicates a lamp control unit 25 for exchanging signals with the machine control unit 20 and controlling operation of the fluorescent lamp 2. For controlling the fluorescent lamp 2 by means of the lamp control unit 25, consideration is made of the fact that, as shown in FIG. 3, the fluorescent lamp 2 has a relative light beam reaching a maximum intensity level when its tube wall temperature is at about 40° C. The relative light beam is at lower intensity levels when the tube wall is at higher or lower temperatures than 40° C. In other words, the tube wall has an optimal temperature set to 40° C.

The lamp control unit 25 includes a microcomputer 26 having a CPU and a RAM, as a main component thereof. The microcomputer 26 is operable in response to a control signal received from the machine control unit 20 for controlling a regulator 27 connected to the fluorescent lamp 2, thereby controlling voltage applied to the lamp 2. Light of the fluorescent lamp 2 is detected by an optical sensor 28 which outputs a photoelectric current. This photoelectric current is converted into a voltage by a photoelectric transfer circuit 29, and the voltage is digitalized by the microcomputer 26 for output to the machine control unit 20. In response to the information concerning the light intensity of the fluorescent lamp 2 thus obtained from the optical sensor 28 through the lamp control unit 25, the machine control unit 20 produces, during a copying operation, a control signal and communicates it to the lamp control unit 25 for adjusting the fluorescent lamp 2 to an appropriate light intensity to provide the copy density determined through the density setting key 23. Thus, the fluorescent lamp 2 is operable under feedback control. The optical sensor 28, photoelectric transfer circuit 29 and microcomputer 26 constitute a light intensity detecting device PD.

During a non-copying period, i.e. a standby period prior to illumination of the original document M, power supply to the fluorescent lamp 2 is continued while the light intensity detected by the light intensity detecting device PD is on the increase. The power supply to the fluorescent lamp 2 is interrupted for a predetermined period commencing with a decrease in the detected light intensity. In this way the power supply to the fluorescent lamp 2 is controlled through the lamp control unit 25 so that the tube wall of the lamp 2 is maintained at the optimal temperature of about 40° C. for allowing a maximum emission efficiency. The optical sensor 28, machine control unit 20 and lamp control unit 25 constitute an illumination control device LC.

The light of the fluorescent lamp 2 is produced by exciting a fluorescent substance with ultraviolet rays radiated through an arc discharge in mercury vapor. The emission efficiency of the fluorescent lamp 2 varies with ultraviolet radiation efficiency which is variable with the pressure of mercury vapor. The mercury vapor pressure in turn is variable with ambient temperature. Taking these facts into consideration, the tube wall of the fluorescent lamp 2 is maintained at the optimal temperature of about 40° C. during the standby period prior to illumination of the original document M. The fluorescent lamp 2 in the state of maximum emission efficiency if thus available to assure an appropriate illumination in starting a copy run as soon as the print key 22 is pressed. This feature provides an increased operating efficiency.

Figure 4A:
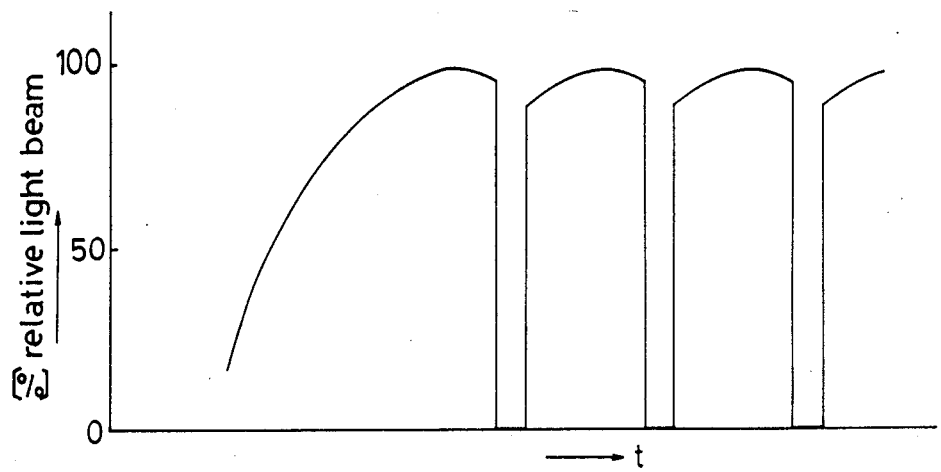
FIGS. 4A, 4B and 4C are time charts of the light beam of the fluorescent lamp in relation to power supply, respectively.
Figure 4B:
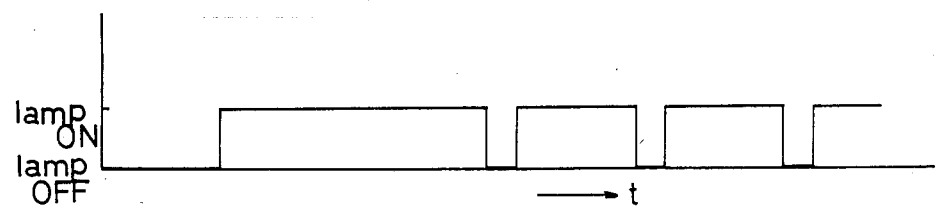
Figure 4C:
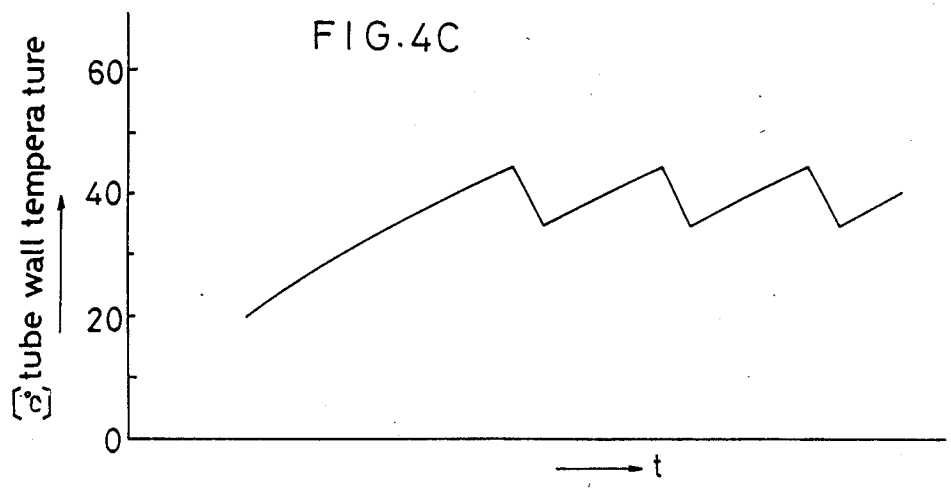

The operation of the machine control unit 20 for controlling the power supply to the fluorescent lamp 2 will be described further with reference to FIG. 4A through 4C. As noted hereinbefore, the light beam and tube wall temperature of the fluorescent lamp 2 are in the relationship shown in FIG. 3. When the detected light intensity of fluorescent lamp 2 is on the increase, the tube wall temperature is judged to be still rising and not to have reached the optimal temperature. Then, as shown in FIGS. 4A through 4B, the power supply to the fluorescent lamp 2 is continued to raise the tube wall temperature through self-heating of the lamp 2. When the detected light intensity begins to decrease, the tube wall temperature is judged to have exceeded the optimal temperature. Then the power supply is interrupted for the predetermined period to stop the self-heating of the lamp 2 until the tube wall temperature becomes lower than the optimal temperature. As a result, the tube wall temperature varies in the vicinity of the optimal temperature as depicted in FIG. 4C.

For maintaining the tube wall temperature of fluorescent lamp 2 in the vicinity of the optimal temperature as described above, the variations in the tube wall temperature are judged from the light intensity detected by the light intensity detecting device PD, which forms the basis for controlling the power supply to the fluorescent lamp 2. This use of light as a medium allows accurate detection of the tube wall temperature at all times regardless of environmental conditions, thereby realizing a reliable tube wall temperature control.

How this electrophotographic copying machine operates will be described hereinafter with reference to the flow charts shown in FIGS. 5, 6A and 6B.

Figure 5:
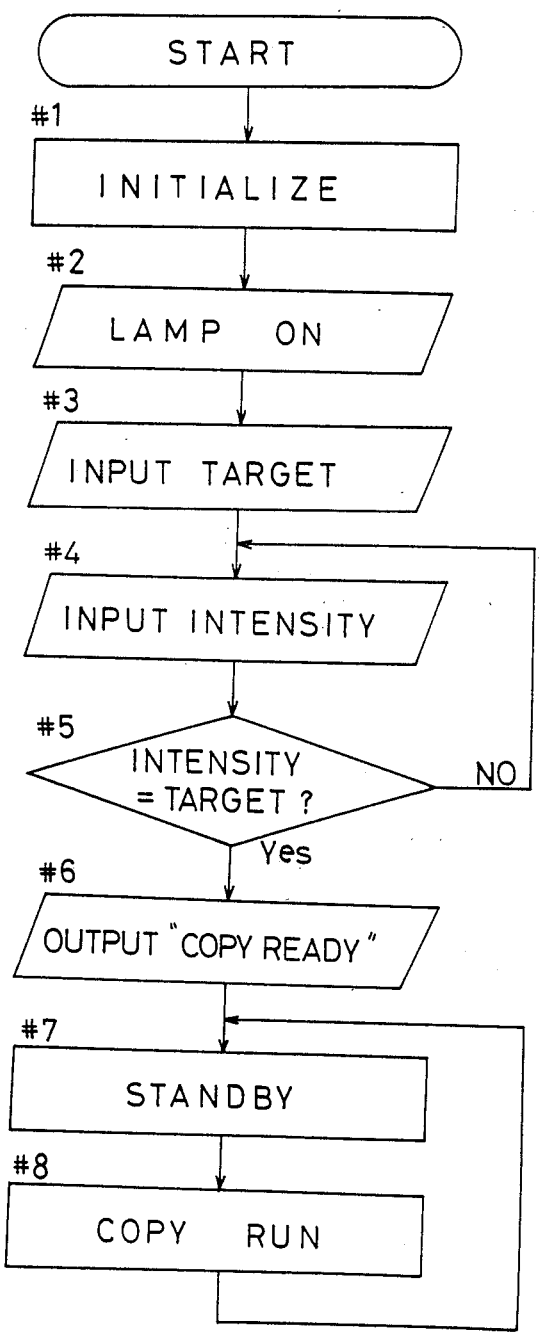
FIGS. 5, 6A and 6B are flow charts illustrating operation of the copying machine, respectively.

FIG. 5 shows a main routine for controlling an overall copying operation.

The main routine starts with closing of the main switch 21, and initializes parameters and the like at step #1. Then, at step #2, the fluorescent lamp 2 is turned on full with the duty ratio of power supply to the lamp 2 set to 100%. At step #3 an input from the copy density setting key 23 is accepted and a target light intensity corresponding to a selected density level is calculated.

At step #4 light intensity information is input to the machine control unit 20 from the optical sensor 28 via the lump control unit 25. Checking is made at step #5 whether the light intensity information agrees with the target light intensity or not. Unless the information agrees with the target light intensity, the program returns to step #4 to repeat input of the light density information from the optical sensor 28. If the target light density is reached, the machine control unit 20 outputs a copy ready signal at step #6, for giving a corresponding indication on a display panel (not shown).

Thereafter a standby subroutine is called at step #7. After returning from the standby subroutine following an operation the print key 22, which will be described later, a copy run control subroutine is called at step #8.

Although not shown in the drawings, the copy run control subroutine executes real-time feedback control based on the light intensity information output from the optical sensor 28 for causing the light intensity of fluorescent lamp 2 to reach the target level. This subroutine also controls the scanning device S and other devices taking part in the copying operation. Upon return from this subroutine with completion of the copying operation, the program executes step #7 repeatedly.

Figure 6A:
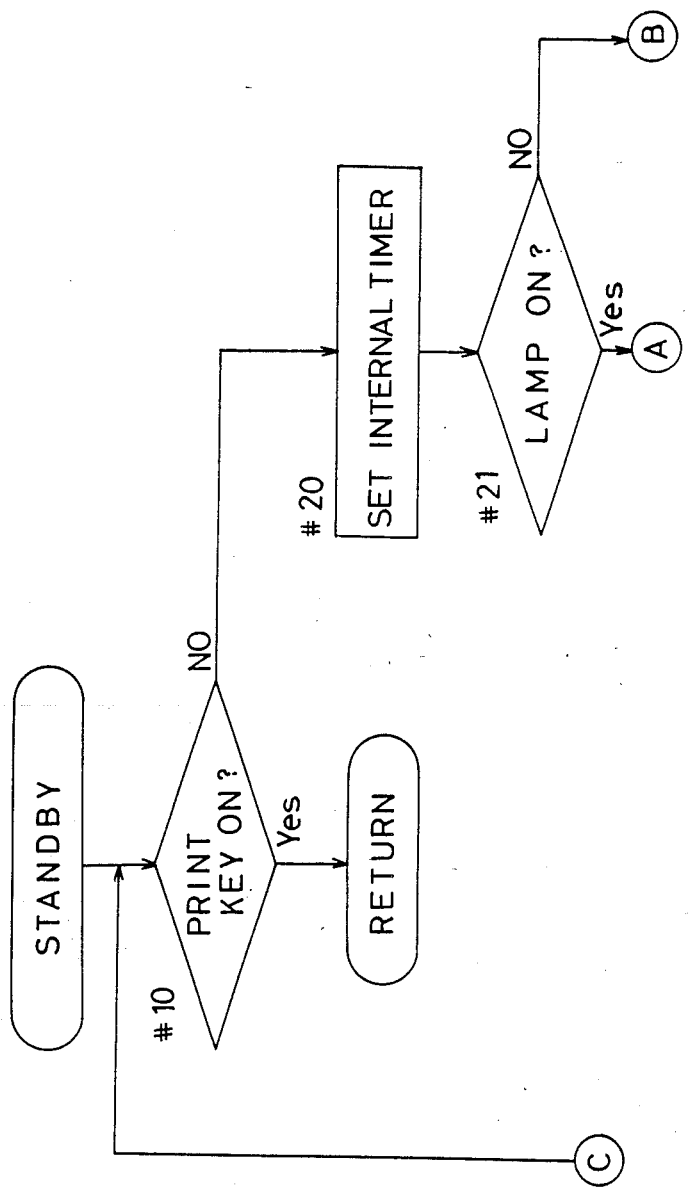
Figure 6B:
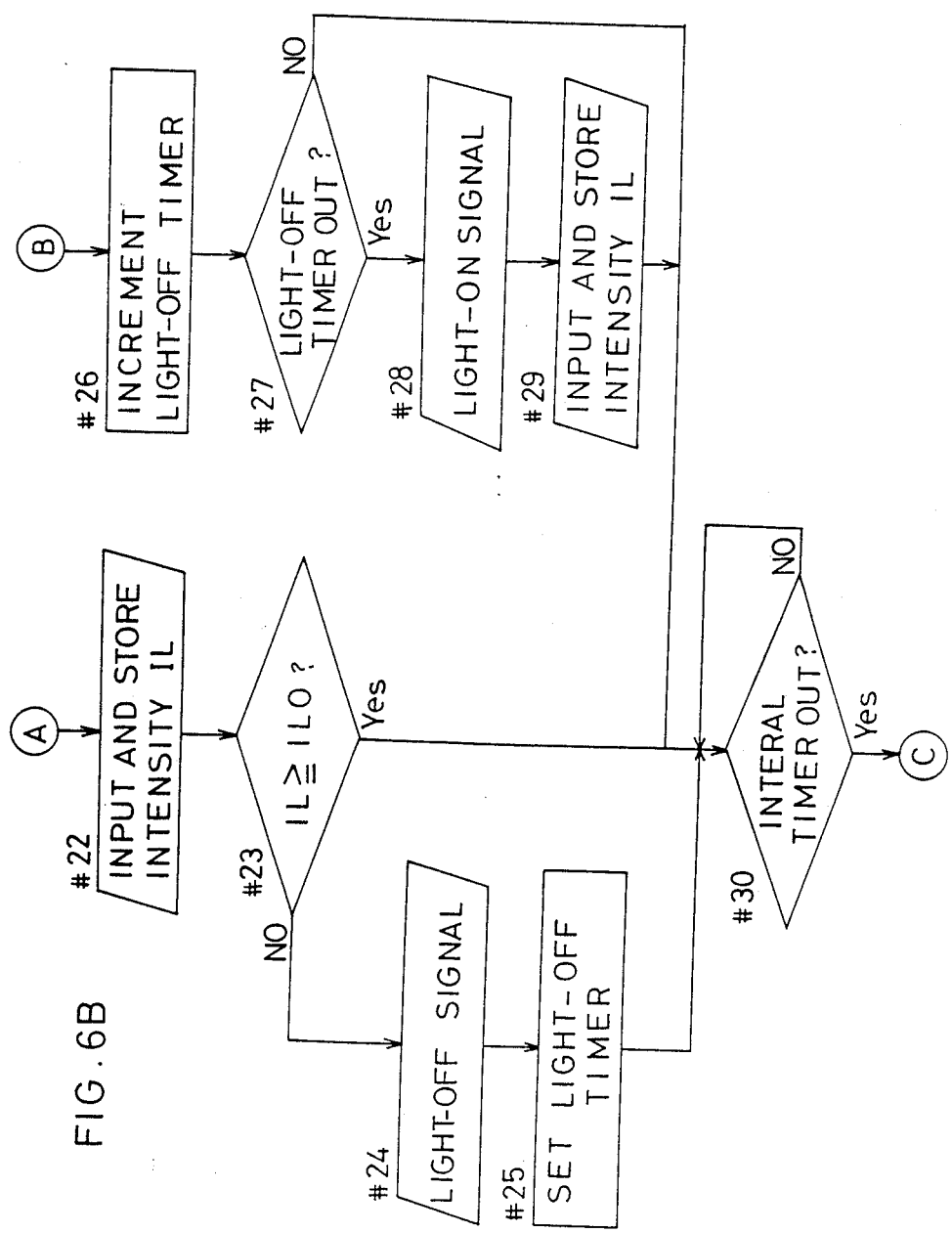

FIGS. 6A and 6B shows a flow chart of the standby subroutine called at step #7 of the main routine.

This subroutine first judges at step #10 whether the print key 22 has been pressed or not. If it has, the program returns to the main routine to carry out a copying operation. If not, the program moves to steps #20 et seq. to control the power supply to the fluorescent lamp 2.

At step #20 an internal timer is set which determines one cycle of the power supply control for the fluorescent lamp 2. Thereafter, at step #21, whether the fluorescent lamp 2 is on or not is judged from the light intensity information provided by the optical sensor 28.

If the lamp 2 is on, light intensity information IL is stored in the RAM at step #22. At step #23 this information is compared with light intensity information ILO provided previously.

If step #23 finds that the light intensity of the fluorescent lamp 2 is increased over the light intensity of the previous time, the tube wall temperature is judged to be rising and not to have reached the optimal temperature. In this case the program moves straight to step #30, continuing the power supply to the fluorescent lamp 2 as described hereinbefore.

If, on the other hand, the light intensity is found lower than that of the previous time, the tube wall temperature is judged to have exceeded the optimal temperature as described hereinbefore. Then, at step #24, a light-off signal is output to the lamp control unit 25 for interrupting the power supply to the fluorescent lamp 2 for the predetermined period. After setting a light-off timer for deciding this period at step #25, the program moves to step #30.

If step #21 finds the fluorescent lamp 2 turned off, the light-off timer set at step #25 is incremented at step #26. At step #27, checking is made whether the light-off timer has run out, that is whether the predetermined time has expired since the fluorescent lamp 2 was turned off.

If the light-off timer has not run out, the program just moves to step #30 without resuming the power supply to the fluorescent lamp 2. If the light-off timer has run out, a light-on signal is output to the lamp control unit 25 at step #28 for resuming the power supply to the fluorescent lamp 2. Then, at step #29, the light intensity information IL is stored in the RAM for the purpose of comparison carried out at step #23, and the program moves to step #30.

At step #30 the program waits for the internal timer set at step #20 to run out, and thereafter returns to step #10 for repeating the described sequence.

Variations in the light intensity of the fluorescent lamp 2, control of the power supply to the lamp 2 based on the light intensity variations, and resulting variations in the tube wall temperature of the lamp 2 take place as per the time charts of FIGS. 4A through 4C.

A further embodiment will be described hereinafter. The foregoing embodiment employs an ON/OFF mode for the power supply control as apparent from FIG. 4B in particular, whereas this embodiment employs a control mode in which power is supplied in different levels selected in accordance with the detected light intensity for increasing or decreasing the tube wall temperature.

Figure 7A:
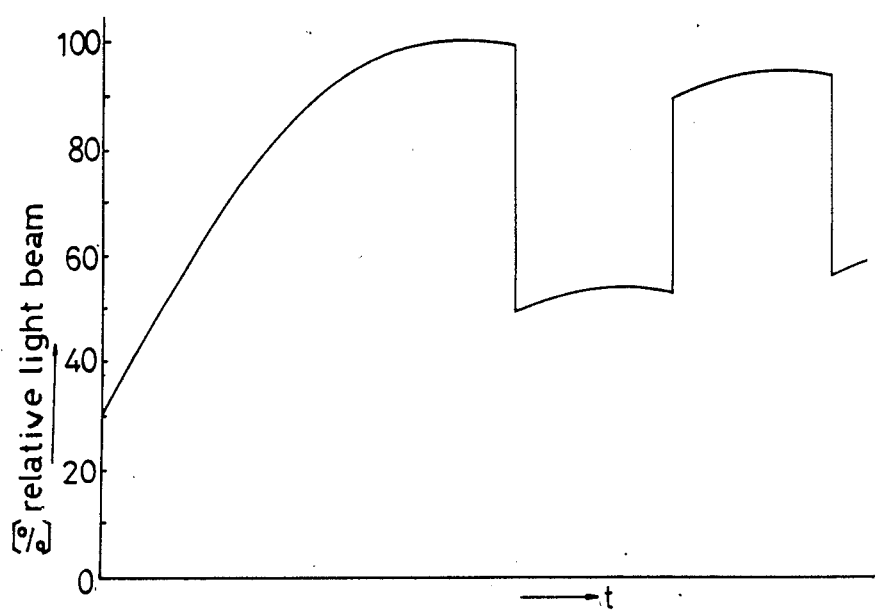
FIG. 7A, 7B and 7C are time charts of the light beam of the fluorescent lamp in relation to power supply according to a further embodiment, respectively.
Figure 7B:
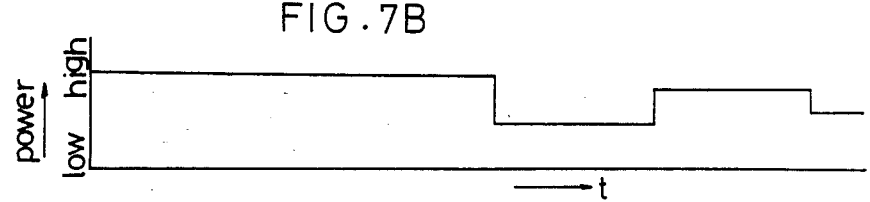
Figure 7C:
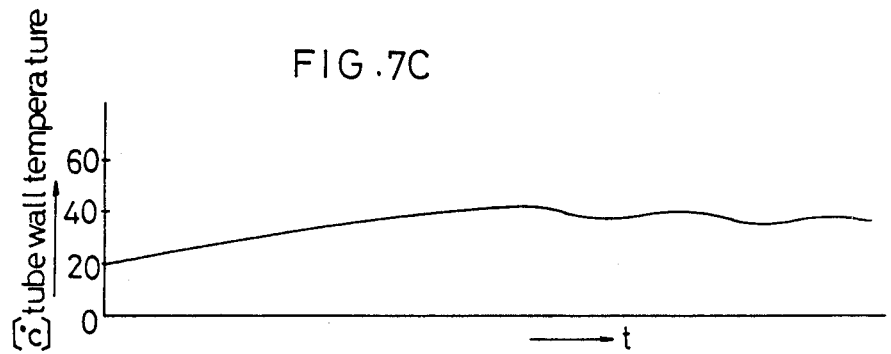

When the detected light intensity of fluorescent lamp 2 is on the increase after the lamp 2 is turned on, the tube wall temperature is judged to be still rising and not to have reached the optimal temperature. Then, as shown in FIGS. 7A and 7B, a first power supply control is selected in which power is supplied to the fluorescent lamp 2 at a high level for raising the tube wall temperature through self-heating of the lamp 2. When the detected light intensity begins to decrease during the first power supply control, the tube wall temperature is judged to have exceeded the optimal temperature. Then a second power supply control is selected in which power is supplied to the fluorescent lamp 2 at a low level for allowing the tube wall to cool until the tube wall temperature becomes lower than the optimal temperature. The second power supply control is maintained on the judgment that an increase in the detected light intensity indicates a decrease in the tube wall temperature toward the optimal temperature. When the detected light intensity begins to increase during the second power supply control, the tube wall temperature is judged to have fallen below the optimal temperature. Then the first power supply control is carried out again. The tube wall temperature of the fluorescent lamp 2 varies as shown in FIG. 7C by reducing the difference between the power levels each time switching is made between the first and second power supply controls, whereby the tube wall temperature is advantageously maintained in the vicinity of the optimal temperature.

Figure 8A:
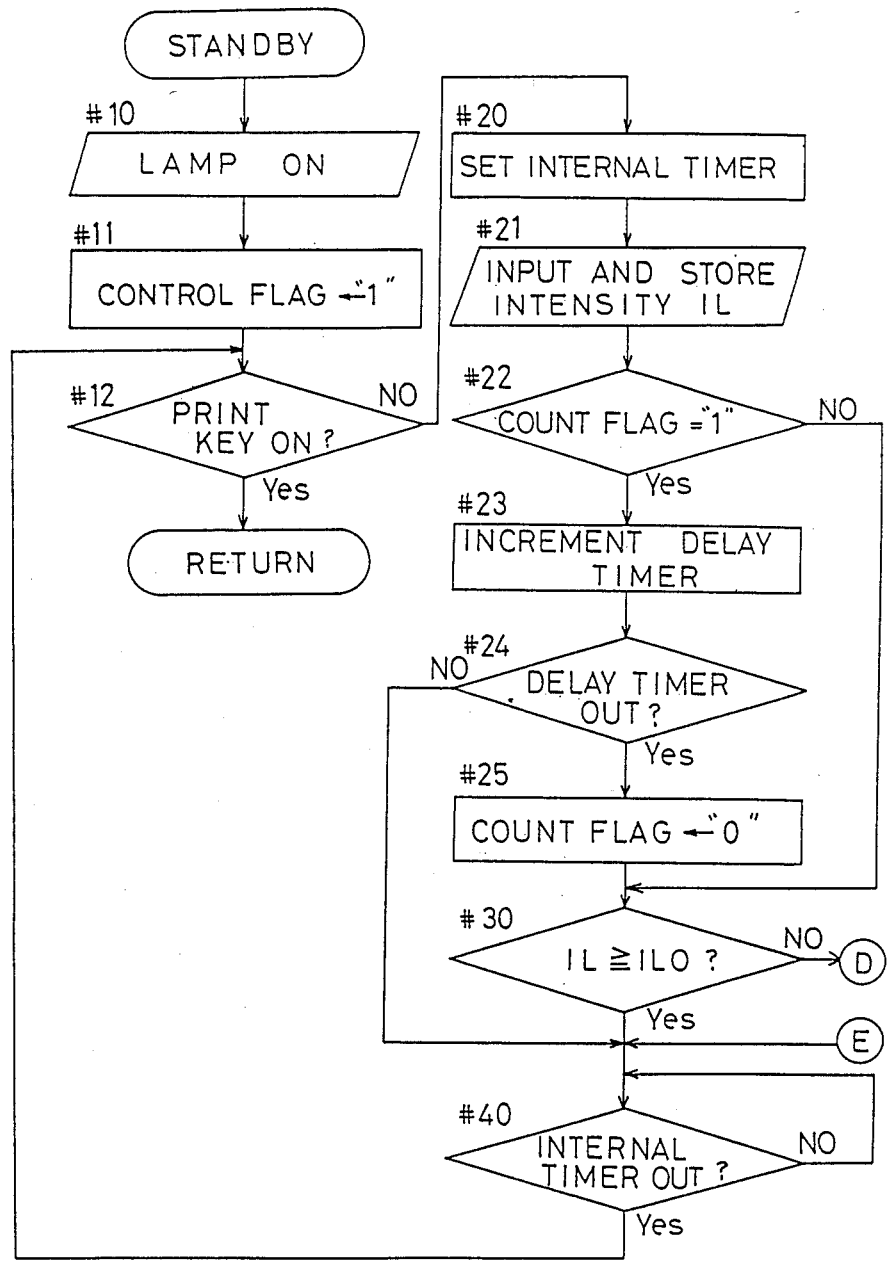
FIG. 8A and 8B are a flow chart illustrating a standby operation according to the further embodiment.
Figure 8B:
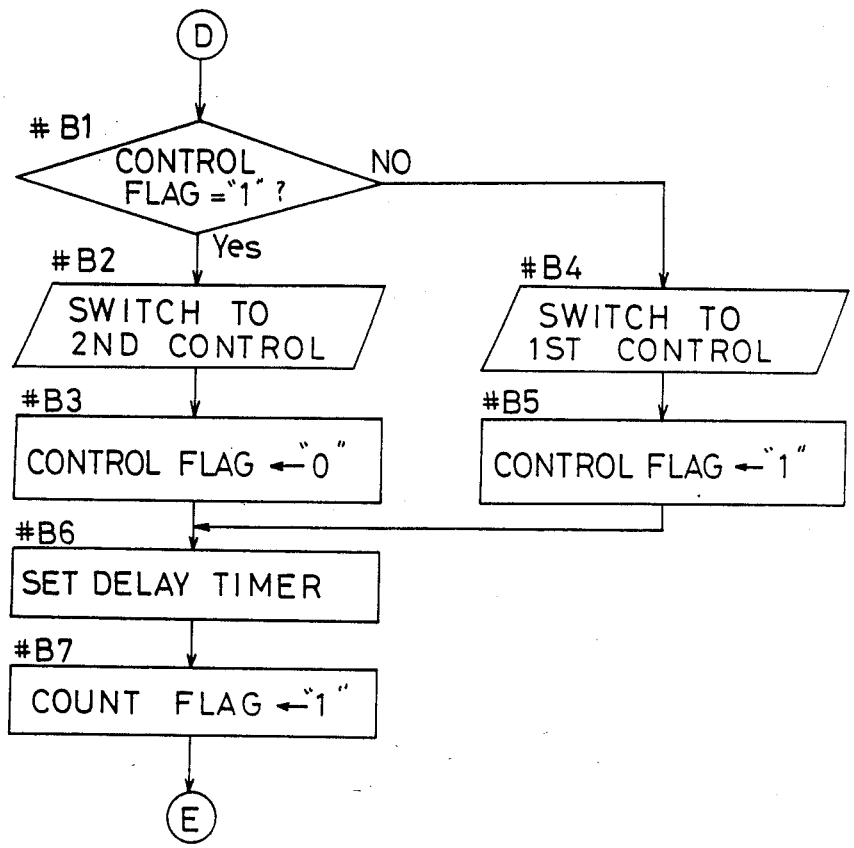

The power supply controls according to this embodiment are executed through the same main routine as in the foregoing embodiment, but naturally a different standby subroutine is required for this embodiment. This subroutine will be described next with reference to FIGS. 8A and 8B.

When this standby subroutine is called, the fluorescent lamp 2 is first turned on full at step #110 with the duty ratio of power supply to the lamp 2 set to 100%. Then step #111 sets a power supply control flag to a first control state, and step #112 judges whether the print key 22 has been pressed or not. If it has, the program returns to the main routine to carry out a copying operation, If not, the program moves to steps #120 et seq. to control the power supply to the fluorescent lamp 2.

At step #120 an internal timer is set which determines one power supply control cycle for the fluorescent lamp 2. Thereafter, at step #121, light intensity information IL is stored in the RAM, and at step #122 a count flag is checked. This count flag is set during counting of a delay timer operable for prohibiting detection of the light intensity until the operation of the fluorescent lamp 2 stabilizes after power supply control switching as described later.

If step #122 finds that the count flag is not set, the program just moves to step #130. If the count flag is set, the delay timer is incremented at step #123 and whether the delay timer has run out or not is judged at step #124.

If the delay timer has not run out, the program just moves to step #140. If the delay timer has run out, the program resets the count flag at step #125 and moves to step #130.

At step #130 the light intensity information IL input at step #121 is compared with light intensity information ILO of the previous time.

If step #130 finds that the light intensity of fluorescent lamp 2 is increased over the light intensity of the previous time, the tube wall temperature is judged to be rising under the first power supply control and not to have reached the optimal temperature, or to be lowering toward the optimal temperature under the second power supply control after having exceeded the optimal temperature. In this case the program just moves to step #140, allowing whichever power supply control is in operation to remain in operation for supplying power to the fluorescent lamp 2.

If, on the other hand, the light intensity of the lamp 2 is found lower than that of the previous time, the power supply control flag is checked at step #131. If this flag is found set, i.e. the first power supply control is in operation, the tube wall temperature is judged to have exceeded the optimal temperature as described hereinbefore. Then, at step #132, a control signal is output to the lamp control unit 25 for switching to the second power control in order to lower the tube wall temperature of fluorescent lamp 2. After setting the power supply control flag at step #133, the program moves to step #136.

If step #131 finds that the power supply control flag is reset, i.e. the second power supply control is in operation, a control signal is output to the lamp control unit 25 for switching to the first power control in order to raise the tube wall temperature of fluorescent lamp 2 again. After setting the power supply control flag at step #135, the program moves to step #136.

At step #136 the delay timer noted hereinbefore is set, and at step #137 the count flag is set. Then the program moves to step #140.

At step #140 the program for the internal timer set at step #120 to run out, and thereafter returns to step #112 for repeating the described sequence.

Variations in the light intensity of the fluorescent lamp 2, controls of the power supply to the lamp 2 based on the light intensity variations, and resulting variations in the tube wall temperature of the lamp 2 take place as per the time charts of FIG. 7A through 7C.

The embodiments of the present invention have been described, in which the optical sensor 28 for automatic density control is used also as part of the light intensity detecting device PD for controlling the tube wall temperature of fluorescent lamp 2 during the standby period prior to illumination of the original document. In this case, the optical sensor 28 serves the purpose of automatic density control during the copying operation, and tube wall control at other times. The sensor 28 serving the two purposes necessitates little modification when applying the present invention to copying machines having the automatic density control function. It is possible within the scope of the invention to provide an optical sensor for the tube wall temperature control in addition to the optical sensor for the automatic density control. The present invention may of course be applied to copying machines without the automatic density control function as well.

Furthermore, while the invention has been described in relation to a copying machine, the document illuminating apparatus according to the present invention is applicable to microfilm printers, image readers and the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A copying machine with a fluorescent lamp as its document exposure light source, comprising:
    means for commanding a copy start;
    exposure scanning means for scanning an original document while exposing the same by illumination of the lamp in response to a command from said copy start command means;
    means for detecting the light intensity of said lamp; and
    power supply means operable outside a document exposure scanning time and in response to an output of said detecting means for supplying power to said lamp selectively at a first level for increasing a tube wall temperature of the lamp and at a second level for decreasing the tube wall temperature in order to maintain the tube wall temperature constant, said power supply means being also operable, with a decrease in the light intensity detected by said detecting means, for cyclically alternating the power supply to said lamp at the first level and at the second level, a difference between the first level and the second level diminishing with each cycle of alternation.

2. A copying machine as claimed in claim 1, wherein said detecting means is disposed in a position for receiving light reflected to the original document exposed by said lamp and detecting an image density of the original document.

3. A copying machine as claimed in claim 2, wherein said exposure scanning means is operable for exposure scanning the original document with a light intensity selected in response to the image density of the original document detected by said detecting means.

4. A method of controlling a copying machine with a fluorescent lamp as its document exposure light source, the steps comprising:
    scanning an original document while exposing the same by illumination of the fluorescent lamp in response to a copy start command;
    detecting light intensity of the lamp, and
    supplying power to the lamp according to the detected light intensity, when the scanning operation of the original document is not executed, selectively at a first level for increasing a tube wall temperature thereof and at a second level for decreasing the tube wall temperature so as to alternate the power between the first and second levels with a decrease in the detected light intensity while diminishing a difference between the first and second levels with each cycle of alternation, thereby maintaining the tube wall temperature constant.

5. A copying machine with a fluorescent lamp as its document exposure light source, comprising:
    means for commanding a copy start;
    exposure scanning means for scanning an original document while exposing the same by illumination of the lamp in response to a command from said copy start command means;
    means for detecting the light intensity of said lamp, and
    power supply means, responsive to the means for detecting, for supplying power to said lamp selectively at a first level for increasing the tube wall temperature and at a second level for decreasing the tube wall temperature, wherein said power supply means is operable, with a decrease in the tube wall temperature detected by said detecting means, for cyclically alternating the power supply to said lamp at the first level and at the second level, with any difference between the first level and the second level diminishing with each cycle of alternation.

6. A copying machine as claimed in claim 5, wherein said detecting means is disposed in a position for receiving light reflected to the original document exposed by said lamp and detecting an image density of the original document.

7. A copying machine as claimed in claim 6, wherein said exposure scanning means is operable for exposure scanning the original document with a light intensity selected in response to the image density of the original document detected by said detecting means.

* * * * *